Jan. 9, 1940.                P. BOLLINGER                2,186,233
             COMBINATION DUST GUARD AND GEAR CASE GREASE SEAL
                       Filed April 21, 1938         2 Sheets-Sheet 2
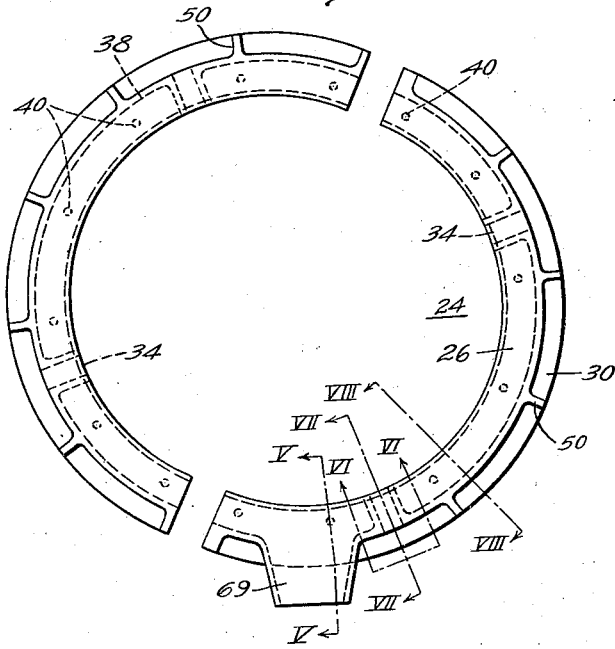
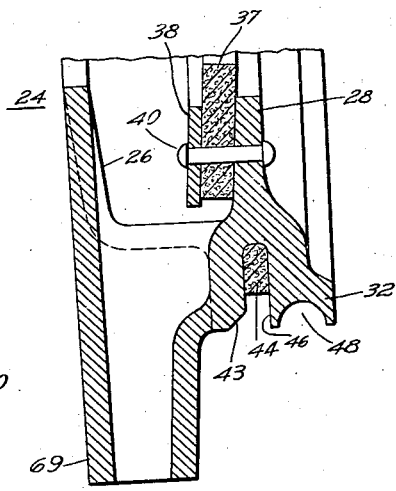
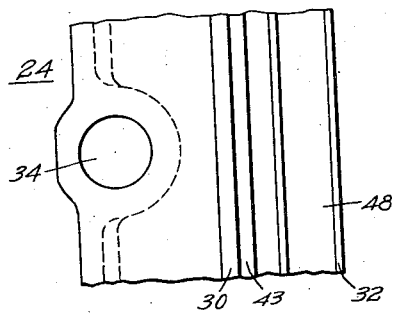
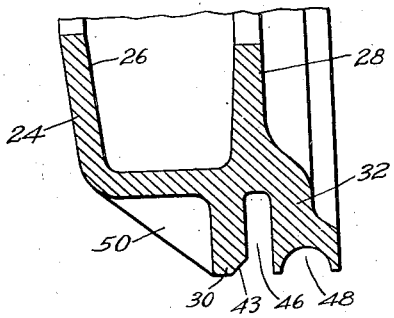
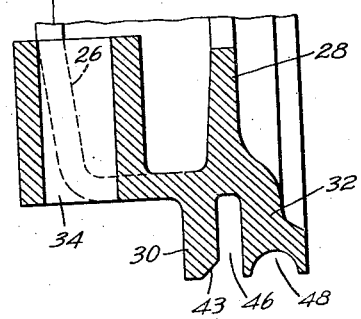
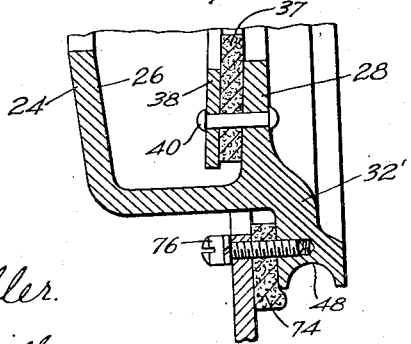
WITNESSES:
C. J. Weller.
B. L. Zangwill
INVENTOR
Paul Bollinger.
BY O. D. Buchanan
ATTORNEY Patented Jan. 9, 1940

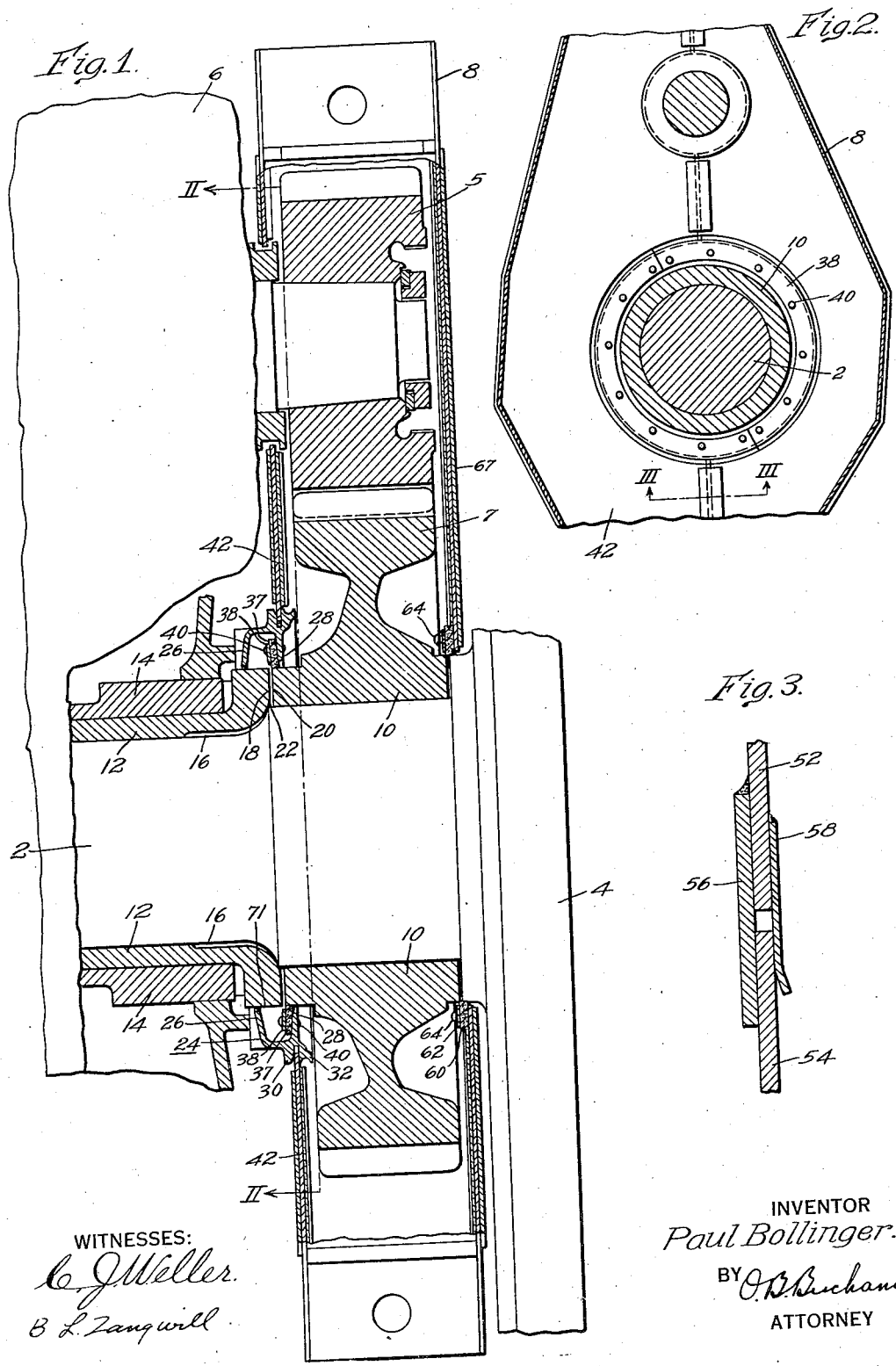

2,186,233

UNITED STATES PATENT OFFICE 2,186,233

COMBINATION DUST GUARD AND GEAR CASE GREASE SEAL

Paul Bollinger, Irwin, Pa., assignor to Westinghouse Electric & Manufacturing Company, East Pittsburgh, Pa., a corporation of Pennsylvania Application April 21, 1938, Serial No. 203,321

19 Claims. (Cl. 308—36.1)

My invention relates specifically to the protection of structures involved in driving a railway car axle by an axle hung electric motor.

Frequently, in such structures the axle bearing has a vertical thrust surface juxtaposed to a cooperating thrust surface on a part of the power transmitting gear in order that space may be conserved, or, perhaps, for some other desired purpose. These surfaces form a thrust bearing which comes into effect during side sway of the car or axle. Usually metal to metal contact is involved and provision must be made to lubricate the thrust bearing. Such lubrication, to my knowledge, is obtained by permitting the oil lubricating the axle bearing to flow outward and down the thrust bearing.

Sometimes to facilitate such escape, the axle bearing is scraped to provide a trough for the flow of oil to the thrust bearing. Heretofore it has been the practice to permit the oil after serving its lubrication function to escape outward from the thrust bearings to go where it may, and such escaping oil would spatter upon the rails, coat the operating units mounted on the truck, and part of the oil would find its way into the gear case. The consequences of such action are objectionable inasmuch as any oil spattering upon the rails decreases the tractive resistance thereof while oil spattered upon the operating units carried by the truck causes them to accumulate grime and dust to an exceptional degree. Perhaps the most objectionable consequence is the diluting of the gear case lubricant by the infiltration into the gear case of the axle bearing oil. Such oil frequently carries with it any dust that may have deposited itself in the thrust bearing or along the path of escape of the oil. The indirect consequence of the escaping oil flowing into the gear case has been to carry this dust along with it which would then cause undue wear of the gearing within the gear case.

It is accordingly an object of my invention to provide a dust cap for the thrust bearing and adjacent surfaces.

It is another object of my invention to prevent escaping axle bearing lubricant entering the gear case so that the former cannot flow into the gear case and dilute the lubricant therein.

It is a further object of my invention to prevent undue spattering of the oil escaping from the thrust bearing.

It is still another object of my invention to provide a simple unit of structure which will achieve the above stated objects and will also serve to maintain alignment of the gear case and hold it rigid.

Other objects and novel features of my invention, both with relation to the specific embodiment thereof and to more generic applications, will be apparent from the following description and drawings, in the latter of which:

Figure 1 is a horizontal view of the driving elements for a motor-driven axle to show in section the relation of my invention thereto.

Fig. 2 is a view on the line II—II of Fig. 1 on a reduced scale.

Fig. 3 is an enlarged sectional view on the line III—III of Fig. 2 and shows the joint of the split gear casing.

Fig. 4 is a view of a combination dust cap and seal with the split sections shown as separated.

Fig. 5 is an enlarged sectional view on the line V—V of Fig. 4.

Fig. 6 is an enlarged view along the line VI—VI of Fig. 4 of the cap per se.

Fig. 7 is an enlarged sectional view on the line VII—VII of Fig. 4 of the cap per se.

Fig. 8 is an enlarged sectional view on the line VIII—VIII of Fig. 4 of the cap per se, and Fig. 9 is an enlarged sectional view of another form of a combined dust cap and seal.

In general, the driving of a car axle 2 having wheel 4 thereon involves a gear 5 driven by a driving motor 6 and meshing with a gear 7 contained in a gear case 8. The motor for the particular embodiment I show is an axle hung motor supported on one side by the axle 2 and on the opposite side by the truck (not shown). The gearing within the gear case 8 includes a gear hub 10 of the gear 7 keyed or otherwise made to turn the axle 2. The axle 2 is journalled in bearings 12 held in bearing seats 14.

The surface of a bearing 12 which contacts the axle 2 may be scraped to provide a small trough 16. Oil supplied to the bearing may conveniently flow from this trough onto thrust surfaces 18 and 20, the former being formed on the bearing 12 and the latter on the gear hub 10. The thrust surfaces 18 and 20 may be deemed to form a thrust bearing to which I apply the reference character 22 for convenience of description. Inasmuch as this surface of the bearing is in a vertical plane, oil escapes quite readily, relatively, and it is usual to store an abundant supply of oil in the reservoir, not shown, which supplies the axle bearing with lubricant. Escaping oil frequently flows along the gear hub surface and into the gear case or spatters out because of centrifugal action with the attendant disadvantages previously mentioned in brief. To overcome these disadvantages as well as to add certain other desirable features of construction, I provide a combination dust cap and seal 24 of the general cross section shown in Figs. 7 and 8. For purposes of description, I describe this cross section as comprising two reversed U's, having legs 26—28 and 30—32, respectively, but I do not desire to be limited to this exact cross section since manifestly any one of the circular flanges or legs 26, 28, 30 and 32 may be of varying heights or in some structures so small as to eliminate the U shape entirely.

The combination dust cap and seal, as assembled, comprises a ring-like structure having holes 34 through which bolts may be inserted for fastening the combination unit to the bearing or bearing seat. Holes (not shown) are provided in the bearing seat for receiving these bolts and are accurately positioned so that the combination unit is secured properly in place. The combination unit in this instance fits around the bearing 12 and gear hub 10 with one of the flange sides 26 abutting the bearing.

Upon the other leg 28 is fastened a split annular felt ring 37 by means of a split annular steel plate 38 and rivets 40. I prefer to fasten the felt on the side of the leg 28 toward the leg 26 so that the edge of the felt is in proximity to the thrust surface 20 of the hub 10. However, it is obvious that this felt may be fastened to the outside of the leg 28, if such be desired. The other U formed by the legs 30 and 32 is accurately machined so that a gear case side 42 fits snugly therein. A chamfer 43 on the leg 30 facilitates the insertion of the gear case side 42. A felt washer 44 is glued or otherwise maintained within the bottom of the outer U 46. At the extremity of the leg 32 of the outer U, I form a groove 48, the purpose of which will be later described. Reinforcing ribs 50 may extend from the bottom of the inner U to the flange or leg 30 of the outer U for the purpose of providing a more rigid structure.

To facilitate the assembly and dismantling of the parts, the gear case and combination unit are split. As shown in Fig. 3, the gear case has an upper half with a side 52 and the lower half with a side 54. To one of the sides, and I prefer the upper side 52, are welded strips 56 and 58 to form guides in which the lower half of the gear case is inserted. The wheel side of the gear case is protected against the escape of oil by felt 60 secured to the gear case by means of a metal plate 62 and rivets 64.

The parts are assembled to have the general relative positions shown in Fig. 1; the combination dust cap and seal is bolted to the bearing seat or bearing, as the case may be, so that leg 26 abuts the part. The walls forming the hole 34 are accurately machined, as is the supporting structure so that the combination unit is accurately positioned in its proper place. The felt 37 bears against the gear hub 10. The gear case side 42 fits snugly between the legs 30 and 32 with its lower edge compressing the felt 44, forming thereby a tight seal against the escape of gear grease. The felt 60 at the wheel end of the gear case prevents the escape of gear grease at that side. Grease diverters (not shown) are fastened to the side 67 of the gear case slightly above the axle for relieving the load upon the felt 60. The groove 48 performs the same function for grease tending to drip down the side 42.

It will be observed that as the gear 10 rotates, the seal formed by the felt rings 37, 44 and 60 prevent the gear grease from leaking out of the case, particularly when the car is at a standstill. The felt 37 further aids in preventing any oil running down from the thrust bearing 22 from entering the gear case. This oil, of course, does escape downwardly into the inner U member but is prevented from being spattered because it is caught by this U member along the entire periphery of the thrust bearing. To prevent an undue accumulation of oil, a spout 69 directed toward the track bed may be formed in the bottom of the combination unit. The spout directs any oil downwardly towards the track bed so that the oil will drop downward to the bed between the tracks rather than on the rails themselves. An additional advantage of the inner U is that it prevents dust from accumulating on the outside surface 71 of the bearing 12 or entering the thrust bearing 22. By positioning the felt ring 37 in proximity to the thrust surface 20, I further protect the gear case against an infiltration of dust since no horizontal surface of the gear hub 10 is exposed to atmospheric air. Only small areas of the vertical thrust surfaces 18 and 20 are exposed through the spout 69. Moreover, these surfaces are washed by the oil lubricating the thrust bearing, and this oil is made to flow through the spout.

In Fig. 9, I show a slight modification of a combination unit in which the leg 30 has been omitted. A felt seal 74 in such instance is glued or otherwise held to a leg 32', and the gear case is fastened to the unit by means of bolts 76 screwed in appropriate holes of the leg 32'.

While I have illustrated my invention in a form which I now believe to be the best mode of application thereof, it is obvious that many changes may be made within the spirit and scope of the invention I have introduced. It is desired, therefore, that the appended claims be given the broadest construction consistent with their language and limited only by the prior art.

I claim as my invention:

1. In a power transmitting mechanism including vertical cooperative thrust surfaces formed by a stationary structure and a rotating structure, means for lubricating said thrust surfaces, gear means coupled to said rotating structure, a stationary lubricant-containing casing for said gear means and having a central opening in proximity to said surfaces, and a seal for separating said lubricants and preventing the entry of outside particles to said surfaces and casing.

2. In a power transmitting mechanism including vertical cooperative thrust surfaces formed by a stationary structure and a rotating structure, means for lubricating said thrust surfaces, gear means coupled to said rotating structure, a stationary lubricant-containing casing for said gear means and having a central opening in proximity to said surfaces, a member generally U-shaped in section fitting said casing about said opening, an inward extension on said member, and a seal attached to said extension abutting said rotating structure and between said gear means and the said surfaces.

3. In a power transmitting mechanism including vertical cooperative thrust surfaces formed by a stationary structure and a rotating structure, means for lubricating said thrust surfaces, gear means coupled to said rotating structure, a stationary lubricant-containing casing for said gear means and having a central opening in proximity to said surfaces, means sealing said casing about said opening, including a central extension and a seal attached to said extension and abutting said rotating structure between said gear means and thrust surfaces.

4. The structure of claim 2 wherein the leg of said member inside the casing has a lubricant diverting groove.

5. The structure of claim 2 having means radially outward of said seal for diverting gear case lubricant therefrom.

6. In a power transmitting mechanism including vertical cooperative thrust surfaces formed by a stationary structure and a rotating structure, means for lubricating said thrust surfaces, gear means coupled to said rotating structure, a stationary casing for said gear means and having a central opening in proximity to said surfaces, a member of reversed generally U-shaped sections, the outer U fitting said casing about said opening, the inner U having one leg abutting the stationary structure, and a seal attached to the other leg abutting said rotating structure.

7. In a power transmitting mechanism including vertical cooperative thrust surfaces formed by a stationary structure and a rotating structure, means for lubricating said thrust surfaces, gear means coupled to said rotating structure, a stationary lubricant-containing casing for said gear means and having a central opening in proximity to said surfaces, a member of generally reversed U-shaped section, the outer U fitting said casing about said opening with one leg inward of the casing, a grease diverting groove on said leg, a seal in said outer section, the inner of said sections having one leg abutting the stationary structure and a seal attached to the other leg abutting said rotating structure.

8. In a power transmitting mechanism including vertical cooperative thrust surfaces formed by a stationary structure and a rotating structure, means for lubricating said thrust surfaces, gear means coupled to said rotating structure, a stationary casing for said gear means and having a central opening in proximity to said surface, a member fastened to said stationary structure and of generally U-shaped section, one leg of which abuts said stationary structure and the other leg having a seal attached which abuts said rotating structure, and means sealing said member about said opening.

9. An electric drive for a railway axle comprising an axle, a lubricated axle bearing also having a thrust bearing surface over which axle bearing lubricant runs, a gear hub on said axle having a cooperating thrust surface, an electric motor power means, gearing including said gear hub for driving said axle from said motor, a lubricant-containing gear case enclosing said gearing and having openings through which said axle extends, means sealing the opening away from said bearings against the escape of gear lubricant, and means sealing the other opening against escape of gear lubricant, and preventing dilution of said gear lubricant by said axle bearing lubricant.

10. An electric drive for a railway axle comprising an axle, a lubricated axle bearing also having a thrust bearing surface over which axle bearing lubricant runs, a gear hub on said axle having a cooperating thrust surface, an electric motor power means, gearing including said gear hub for driving said axle from said motor, a lubricant-containing gear case enclosing said gearing and having openings through which said axle extends, means sealing the opening away from said bearings against the escape of gear lubricant, means sealing the other opening against escape of gear lubricant, and preventing dilution of said gear lubricant by said axle bearing lubricant, and means for enclosing said thrust surfaces for the exclusion of outside particles and the catching of lubricant escaping from said thrust bearing surfaces.

11. An electric drive for a railway axle comprising an axle, a lubricated axle bearing also having a thrust bearing surface over which axle bearing lubricant runs, a gear hub on said axle having a cooperating thrust surface, an electric motor power means, gearing including said gear hub for driving said axle from said motor, a lubricant-containing gear case enclosing said gearing and having openings through which said axle extends, means sealing the opening away from said bearings against the escape of gear lubricant, means sealing the other opening against escape of gear lubricant, and preventing dilution of said gear lubricant by said axle bearing lubricant, and means for enclosing said thrust surfaces for the exclusion of outside particles and the catching of lubricant escaping from said thrust bearing surfaces, the last two means comprising a member fastened to said axle bearing and of general U-shaped section, one leg of which abuts the outside of said axle bearing and the other leg having a seal attached which abuts said gear hub.

12. An electric drive for a railway axle comprising an axle, a lubricated axle bearing also having a thrust bearing surface over which axle bearing lubricant runs, a gear hub on said axle having a cooperating thrust surface, an electric motor power means, gearing including said gear hub for driving said axle from said motor, a lubricant-containing gear case enclosing said gearing and having openings through which said axle extends, means sealing the opening away from said bearings against the escape of gear lubricant, means sealing the other opening against escape of gear lubricant, and preventing dilution of said gear lubricant by said axle bearing lubricant, and means for enclosing said thrust surfaces for the exclusion of outside particles and the catching of lubricant escaping from said thrust bearing surfaces, the last two means comprising a member of reversed generally U-shaped sections, the outer U fitting said case about said last openings, the inner U having one leg abutting the outside of said axle bearing, and a seal attached to the other leg abutting said rotating structure.

13. An electric drive for a railway axle comprising an axle, a lubricated axle bearing also having a thrust bearing surface over which axle bearing lubricant runs, a gear hub on said axle having a cooperating thrust surface, an electric motor power means, gearing including said gear hub for driving said axle from said motor, a lubricant-containing gear case enclosing said gearing and having openings through which said axle extends, means sealing the opening away from said bearings against the escape of gear lubricant, means sealing the other opening against escape of gear lubricant, and preventing dilution of said gear lubricant by said axle bearing lubricant, and means for enclosing said thrust surfaces for the exclusion of outside particles and the catching of lubricant escaping from said thrust bearing surfaces, the last two means comprising a member of reversed generally U-shaped sections, the outer U fitting said case about said last openings, and having a seal in the bottom of the U, the leg of said last section inside said case having a lubricant diverting groove, the inner U having one leg abutting the outside of said axle bearing, and a seal attached to the other leg abutting said rotating structure.

14. The structure of claim 11 in which said last member is a split member.

15. The structure of claim 12 in which the last said member is a split member and said gear case is split.

16. The structure of claim 13 in which the last said member is a split member and said gear case is split.

17. A combined dust cap and seal for an electric railway device comprising a ring like split member of reversed generally U-shaped sections, a split-ring seal of felt or the like fastened to an inner side of a leg of the inner one of said sections, a split ring seal of felt or the like secured in the bottom of the other of said sections, and a groove on the outside leg of said other section.

18. In a power transmitting mechanism including a stationary structure and a rotating structure having vertical, cooperative thrust surfaces, means for lubricating said thrust surfaces, gear means coupled to said rotating structures, partition means between said gear means and thrust surfaces and having a central opening in proximity to said surfaces, a ring-like member having a U section with one leg secured to said stationary structure, and the other leg in proximity to said rotating structure, a seal between the last said leg and said rotating structure, means sealing said member to the periphery of said opening, and an outlet spout from said member.

19. The structure of claim 18 wherein said outlet comprises a spout directed downwardly and disposed away from said gear means.

PAUL BOLLINGER.